Figure 1:
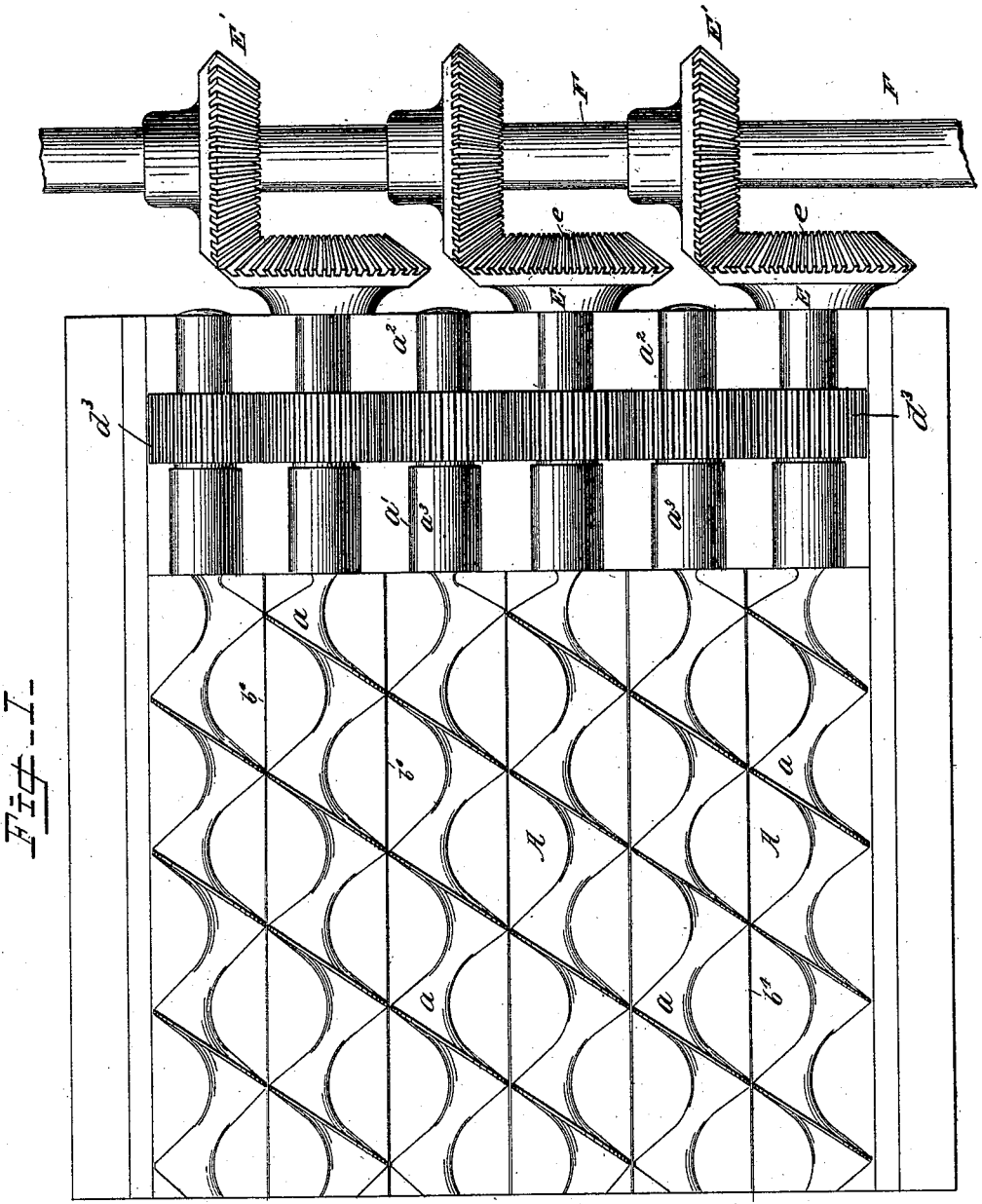

(No Model.) 3 Sheets—Sheet 1.

J. J. DENBEIGH.
MACHINE FOR MOLDING AND SHAPING PLASTIC MATERIALS.

No. 498,206. Patented May 23, 1893.

Attest:
Arthur W. Erb.
Reeve Lewis

Inventor:
Joseph J. Denbeigh
by Pollok & Mauro
his attorneys

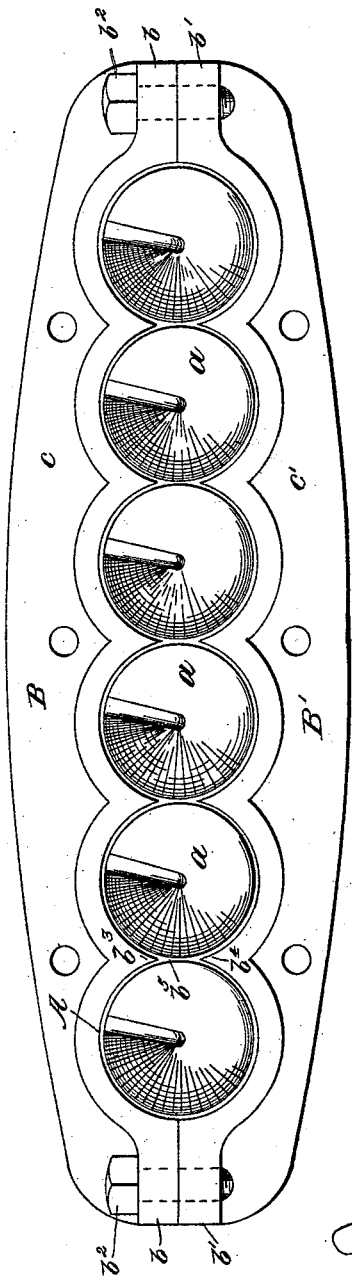

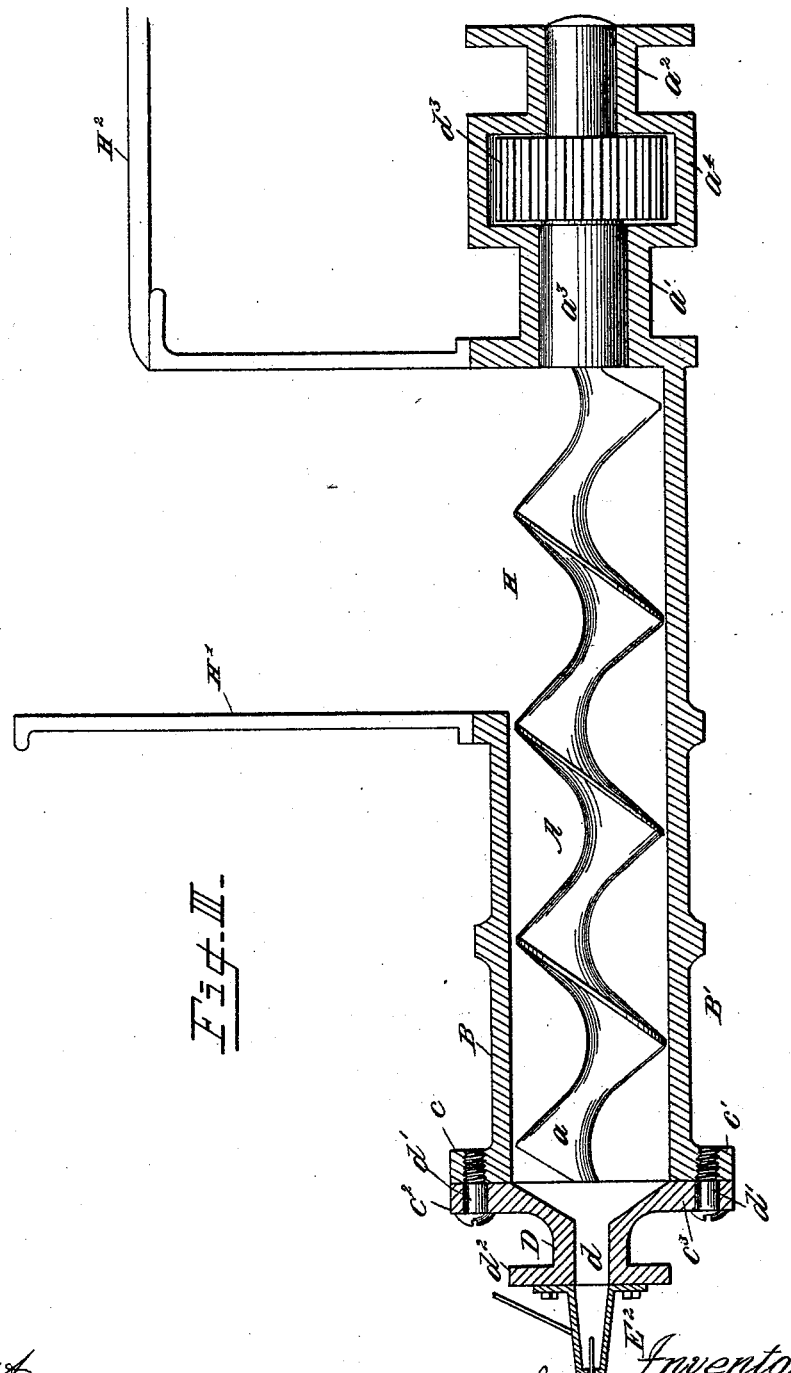

UNITED STATES PATENT OFFICE.

JOSEPH JONAS DENBEIGH, OF BROOKLYN, ASSIGNOR OF THREE-FIFTHS TO A. K. GARDINER AND C. E. GARDINER, OF NEW YORK, N. Y.

MACHINE FOR MOLDING AND SHAPING PLASTIC MATERIALS.

SPECIFICATION forming part of Letters Patent No. 498,206, dated May 23, 1893.

Application filed February 16, 1893. Serial No. 462,632. (No model.)

*To all whom it may concern:*

Be it known that I, JOSEPH JONAS DENBEIGH, of Brooklyn, county of Kings, State of New York, have invented a new and useful Improvement in Machines for Molding and Shaping Plastic Materials, which is fully set forth in the following specification.

The present invention has reference to machines for shaping and molding plastic materials and especially such substances as candies, crackers, soap, &c., for the production of a continuous sheet of lozenge paste, or of rods, sticks, tubes and other shapes.

In machines of this class where a screw is employed to compress and feed the material, it is customary to provide a separate cylinder, feed opening, and discharge opening for each screw. According to the present invention, a series of compression chambers, or cylinders, are formed side by side, each communicating with the chamber or chambers adjacent to it. The entire series of chambers may be conveniently formed by a two-piece corrugated casing, as hereinafter described, and may have a common feed opening. In each chamber is arranged a screw, preferably without a central core, and the edge of each screw approaches very closely to that or those adjacent to it. The screws are rotated by gearing so as to turn in opposite directions, but are alternately right and left handed screws, so that the feed of the material is in the same direction. The results accomplished by this arrangement are a very thorough working and uniform treatment of the material, which, by the co-operating action of contiguous screws is subjected to a kind of braiding process, and an equalization of pressure and uniform distribution of the material, in that any surplus or excess in one compartment would escape into the next. These results are attained with great economy, both as to the construction of the machine itself and as to its operation, the machine being capable of acting upon a relatively large quantity of material. By the action of the screws the plastic substance is fed to the exit or discharge end of the machine, which will be constructed according to the particular object desired.

For producing tubular articles it is preferred to use a die-plate constructed as described in Letters-Patent No. 478,279, granted July 5, 1892, to C. E. Gardiner.

The invention, its objects and advantages will be more fully understood from the following description, reference being had to the accompanying drawings which illustrate one form of machine constructed in accordance with the invention.

In the drawings:—Figure I, is a top plan view of my machine, with the compression chamber, die orifice, and the upper half of the casing removed. Fig. II, is an end view from the left of Fig. I, and Fig. III is a vertical longitudinal section of my complete machine.

A represents the respective compression chambers of the series, in which rotate the compression screws $a$. These compression chambers, which are approximately cylindrical in shape, are formed by the upper and lower corrugated casings or castings B and B' respectively, each provided with horizontal flanges $b$ and $b'$ at the side edges thereof, which are clamped together by screw-bolts $b^2$. The compression chambers are formed by the inwardly projecting oppositely arranged partitions $b^3$ and $b^4$ on the respective casings B and B', a suitable communicating opening $b^5$ being left between the ends of said partitions.

The casings B and B' are provided at one end with the vertical flanges $c$ and $c'$ respectively, to which are secured by bolts $d'$ corresponding flanges $c^2$ and $c^3$ of the casting D, which forms the several separate and distinct compression tubes $d$ of the respective chambers. At the opposite ends of the casings are formed bearings $a'$, $a^2$ for the ends of the several shafts $a^3$ which carry the screws $a$. Suitable housings $a^4$ are also provided in each casing, between the bearings $a'$ and $a^2$, in which are placed gear-wheels $d^3$ carried by shafts $a^3$, the gear wheels of adjacent shafts being in engagement. Alternate shafts are provided each with a projecting end $e$, which carries a bevel gear-wheel E, which is driven by a corresponding gear-wheel E' on the main drive-shaft F.

The upper casing B is provided with a feed opening H, extending across the machine over the rear ends of the compression screws $a$. Above the feed opening H, is placed a suitable hopper H', having a feed-table H² at one side thereof.

To the vertical flanges $d^2$ of the outer end of the casting D are secured (around the compression orifices or tubes $d$) the die-nozzles E², each of which may be of the same or of different design, and which is preferably of the construction shown and described in the patent before referred to.

The several spiral compression screws $a$ are formed without any central core, by which construction no corners and recesses are formed in which the material could lodge, and consequently the plastic substance being acted upon is kept continually and uniformly in motion. These screws are arranged at any suitable distance apart, or in contact if desired, are alternately right and left hand, and are rotated in opposite directions through the gearing heretofore referred to. In this manner all tendency of the material to wedge between the several screws is obviated. The connections between the adjacent cylinders allow a sort of braiding process to take place when the edges of the screws touch or closely approach each other, and also permit any surplus of material in one chamber to pass into the next, thus equalizing the distribution of the material, and producing uniformity of pressure in the compression chambers and regular delivery from the die-orifices.

The machine can be conveniently and thoroughly cleaned by removing the top casing or casting B.

From the above description it will be seen that any convenient number of cylinders and various forms and sizes of compression tubes and of die-nozzles may be employed, and that other modifications may be made, without departing from the spirit of the invention.

What I claim is—

1. In a machine for molding and shaping plastic materials, the combination with a series of parallel compression chambers communicating each from end to end with its adjacent chamber or chambers, and each having a separate discharge orifice, of compression screws one in each of said chambers, substantially as described.

2. In a machine for molding and shaping plastic materials, the combination with a series of parallel compression chambers each communicating from end to end with its adjacent chamber or chambers, throughout the entire series, and having each a separate discharge orifice, said chambers being formed by a casing having oppositely arranged inwardly projecting ribs or ridges, of compression screws in said chambers, substantially as described.

3. The combination of a series of parallel compression chambers each provided with a separate discharge orifice, said chambers communicating laterally one with the other from end to end throughout the entire series, of a screw in each chamber, the edges of adjacent screws being in close proximity, substantially as described.

4. The combination with the casing having its interior subdivided into a series of parallel chambers each communicating from end to end with its adjacent chamber or chambers, all having a common feed opening and each having a separate discharge orifice, of a series of screws one in each chamber, substantially as described.

5. The combination with the casing having a series of parallel communicating chambers, of a series of screws in said chambers, adjacent screws having oppositely formed threads, and gearing for rotating alternate screws in one direction, and the intermediate screws in the opposite direction, substantially as described.

6. The combination with a series of compression screws carried by shafts at one end thereof, and operating in a series of communicating compression chambers, of a gear wheel for each of said shafts, each of which engages the corresponding gear-wheel on the adjacent shafts, compression tubes at the opposite ends of said chambers, and means for communicating motion to said shafts, substantially as described.

7. The combination with a series of communicating compression chambers, of rotatable spiral compression screws formed without a central core operating in said chambers, said screws being alternately right and left hand, and means for rotating adjacent screws in opposite directions, substantially as described.

In testimony whereof I have signed this specification in the presence of two subscribing witnesses.

JOSEPH JONAS DENBEIGH.

Witnesses:
  A. K. GARDINER,
  BERTHA EHRLICHER.